(12) United States Patent
Emeott et al.

(10) Patent No.: US 9,001,694 B2
(45) Date of Patent: Apr. 7, 2015

(54) METHODS AND APPARATUS FOR CONTROLLING A WIRELESS STATION

(71) Applicant: General Instrument Corporation, Horsham, PA (US)

(72) Inventors: Stephen P. Emeott, Rolling Meadows, IL (US); Andrew J. Aftelak, Palatine, IL (US); Anthony J. Braskich, Palatine, IL (US); Dwight R. Smith, Grapevine, TX (US)

(73) Assignee: General Instrument Corporation, Horsham, PA (US)

( * ) Notice: Subject to any disclaimer, the term of this patent is extended or adjusted under 35 U.S.C. 154(b) by 85 days.

(21) Appl. No.: 13/625,271

(22) Filed: Sep. 24, 2012

(65) Prior Publication Data

US 2014/0086121 A1    Mar. 27, 2014

(51) Int. Cl.
*G08C 17/00* (2006.01)
*G06F 9/445* (2006.01)
*H04L 29/12* (2006.01)
*H04L 29/08* (2006.01)
(Continued)

(52) U.S. Cl.
CPC .............. *G06F 9/445* (2013.01); *H04L 61/30* (2013.01); *H04L 67/12* (2013.01); *H04L 67/125* (2013.01); *H04L 67/16* (2013.01); *H04L 67/34* (2013.01); *H04W 4/005* (2013.01); *H04W 52/0212* (2013.01); *H04W 76/048* (2013.01); *H04W 84/18* (2013.01); *H04W 88/08* (2013.01)

(58) Field of Classification Search
None
See application file for complete search history.

(56) References Cited

U.S. PATENT DOCUMENTS 6,952,578 B1 * 10/2005 Pedersen et al. ............ 455/414.2
7,330,712 B2 * 2/2008 Kirkup et al. ................ 455/411
(Continued)

FOREIGN PATENT DOCUMENTS

EP    2328325 A1    6/2011

OTHER PUBLICATIONS

Kshirasagar Naik: "A Survey of Software Based Energy Saving Methodologies for Handheld Wireless Communication Devices", Tech. Report No. 2010-13, Dept. of ECE, University of Waterloo, Ontario, Canada, N2L3G1, https://ece.uwaterloo.ca/~snaik/energy.pdf, Oct. 2010, all pages, pp. 1-46.

(Continued)

*Primary Examiner* — Robert Wilson
(74) *Attorney, Agent, or Firm* — Stewart M. Wiener

(57) ABSTRACT

Methods and apparatus for controlling a wireless station (102) are disclosed. In an embodiment, an access point (104), or any other suitable device or system, receives a first application identifier from a first wireless station (102) at an access point (104) (e.g., receive a URL from a temperature sensor). The access point (104) then downloads and/or activates a software application to the access point (104) from a first server (106) based on the first application identifier (e.g., download a temperature measurement application based on the URL). The access point (104) issues a command to the first wireless station (102) based on the software application (e.g., send temperature measurement and sleep instructions to the temperature sensor). The access point (104) also receives first data from the first wireless station (102) (e.g., receive temperature measurements from the sensor). The access point (104) transmits the first data to at least one of the first server (106) and a second different server (106) (e.g., send the temperature measurements back to the server).

28 Claims, 6 Drawing Sheets

(51) Int. Cl.
*H04W 84/18* (2009.01)
*H04W 4/00* (2009.01)
*H04W 52/02* (2009.01)
*H04W 76/04* (2009.01)
*H04W 88/08* (2009.01)

(56) References Cited

U.S. PATENT DOCUMENTS

| | | | |
|---|---|---|---|
| 7,974,574 B2* | 7/2011 | Shen et al. | 455/11.1 |
| 8,009,608 B2 | 8/2011 | Karaoguz et al. | |
| 8,515,403 B1* | 8/2013 | Vu | 455/414.3 |
| 2003/0096590 A1 | 5/2003 | Satoh | |
| 2005/0122233 A1 | 6/2005 | Isomaya et al. | |
| 2007/0152813 A1* | 7/2007 | Mathur et al. | 340/539.22 |
| 2007/0299956 A1 | 12/2007 | Odaka et al. | |
| 2010/0080206 A1 | 4/2010 | Yamada | |
| 2010/0248719 A1* | 9/2010 | Scholaert | 455/434 |
| 2011/0092164 A1 | 4/2011 | Spanhake | |
| 2012/0144083 A1* | 6/2012 | Hassan et al. | 710/303 |
| 2013/0115916 A1* | 5/2013 | Herz | 455/411 |
| 2013/0246543 A1* | 9/2013 | Pasek | 709/206 |
| 2014/0003286 A1* | 1/2014 | Estevez et al. | 370/254 |
| 2014/0086121 A1* | 3/2014 | Emeott et al. | 370/311 |

OTHER PUBLICATIONS

David Pearce: "Developing the ETSI Aurora Advanced Distributed Speech Recognition Front-End and What Next?", in Prceedings IEEE Automatic Speech Recognition and Understanding Workshop, 2001, all pages, pp. 1-4.

PCT Search Report & Written Opinion, Re: Application #PCT/US2013/061500; dated Apr. 17, 2014.

K. Kang, et al., "Device Detection and Driver Provisioning Mechanism for Small Devices", Toward Network Innovation Beyond Evolution: The 9th International Conference on Advanced Communication Technology, Feb. 2007, pp. 1587-1590.

* cited by examiner

METHODS AND APPARATUS FOR CONTROLLING A WIRELESS STATION

TECHNICAL FIELD

The present disclosure relates in general to wireless stations, and, in particular, to methods and apparatus for controlling a wireless station.

BACKGROUND

Wireless sensors are used in a variety of applications such as reading gas meters, monitoring temperatures, etc. These wireless sensors are often placed in locations where they cannot be plugged in to a wired power source and therefore must rely on battery power for long periods of time. To conserve battery power, these devices typically go in to a low power mode between measurements and communications.

Once a wireless sensor has recorded a certain amount of data, that data may be transmitted back to a central server for further processing. For example, gas meter readings may be sent to the associated gas company in order to prepare gas bills for those customers. In addition, sensor applications must allow for data collection and processing behaviors that change over time based upon changing environmental and operating conditions. For example, measurements should be taken only when they are needed, and the sensor should shut down or slow down to conserve energy when less information is needed or when other devices can take on some of the measurement taking burden. Accordingly, the central server may transmit new instructions to the wireless sensor. For example, the server may instruct the sensor to only take temperature readings once every hour instead of twice every hour.

Often, these wireless sensors communicate with the central server via an access point. An access point is a device that allows wireless devices, such as wireless sensors, to connect to a wired network, such as the Internet. However, each time the wireless sensor sends data to the central server and/or receives instructions from the central server, the wireless device must come out of low power mode and use power to perform the communications.

DETAILED DESCRIPTION OF EXEMPLARY EMBODIMENTS

Figure 1:
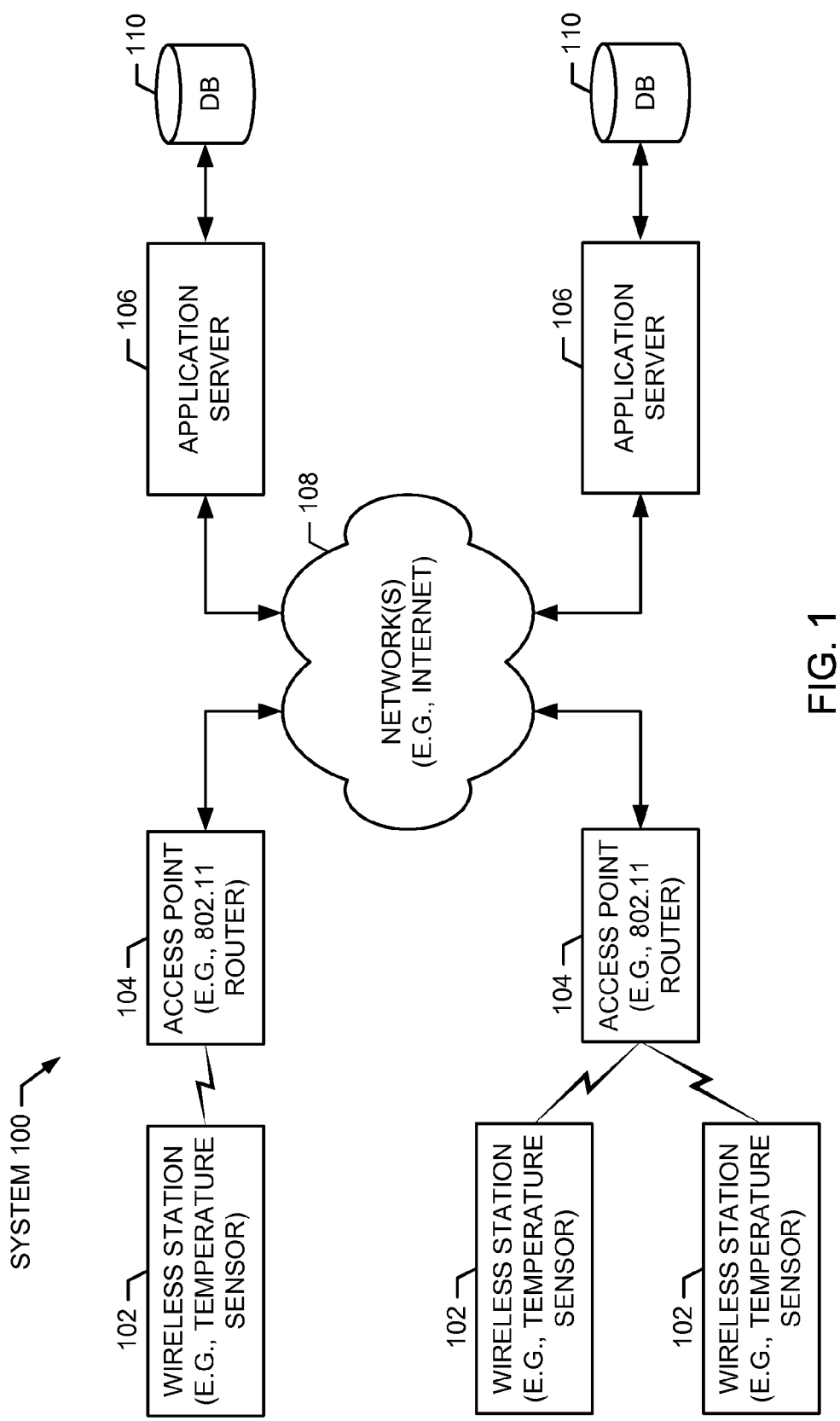
FIG. 1 is a block diagram of an example network communication system.

Briefly, methods and apparatus for controlling a wireless station are disclosed. In an embodiment, a remote station (e.g., a remote sensor) indicates to an access point (e.g., 802.11 type router) what application software the access point should download and/or activate in order to appropriately interact with the remote station. The application software may, in some embodiments, cause the access point to instruct the remote station to take measurements, report measurements and perform actions (e.g. issue a beep or update/retrieve general configuration information including software, battery and radio parameters). The access point may, based on the software application, instruct the remote station when to sleep and when to wake up. In other embodiments, the application software may allow the access point to instruct the remote station to take measurements more frequently during certain intervals than during others (e.g. daytime versus nighttime, foreground versus background) in order to conserve battery life. The access point may also, according to the software application set up triggers to guide reporting, such as instructing the access point to issue reports without delay when certain events occur In an embodiment, an application ID receiver is structured to receive a first application identifier from a first wireless station at an access point (e.g., a wireless temperature sensor sends a URL). An application downloader operatively coupled to the application ID receiver is structured to download a software application to the access point from a first server based on the first application identifier (e.g., access point retrieves a temperature sensing application based on the URL). A controller operatively coupled to the application downloader and a transmitter is structured to issue a command to the first wireless station based on the software application (e.g., instruct temperature sensor to wake up and take one reading every five minutes and report all data in one hour). A transceiver operatively coupled to the controller is structured to receive first data from the first wireless station (e.g., receive 12 temperature measurements from the past hour). A network interface operatively coupled to the transceiver is structured to transmit the first data to at least one of the first server and a second different server (e.g., send 36 temperature measurements from the past three hours to the same server where the temperature sensing application was downloaded and/or to another server).

Among other advantages, wireless sensors in the disclosed system conserve battery power by offloading much of the data processing and communication overhead to the access point. The wireless sensors only execute the portions of the application required to gather and forward data, and not the full application logic. For example, a sensor may quickly communicate a set of readings to the access point using a low overhead 802.11 or similar point-to-point protocol, and the access point, which is typically connected to a wired power source, may then take on the additional burden and overhead associated with communicating over the Internet to a server. For example, the wireless station may not need to implement protocols such as Internet Protocol (IP), Transport Control Protocol (TCP) or HyperText Transport Protocol (HTTP) to send data to the access point, which can implement these protocols. In those cases where network communication errors might arise it is also more efficient for the access point to resolve problems (e.g. via temporary storage and delayed message retransmission). Having the access point execute the server communication application logic instead of the wireless sensor reduces the amount of processing the wireless sensor must perform, thereby conserving battery power.

In one example, the controller is structured to issue a command associated with a sleep mode behavior of the first wireless station. In one example, the application ID receiver receives a second application identifier from a second different wireless station, the second application identifier being indicative of the software application, the application downloader determines that the software application is already installed on the access point, and the controller executes the software application at the access point, thereby causing the access point to (a) issue commands to the second wireless station, (b) receive second data from the second wireless station, and (c) transmit the second data to at least one of the first server and the second server. In one example, the transmitter broadcasts a signal indicative of a capability of the access point to dynamically accept station control software. In one example, the application ID receiver is structured to receive a uniform resource locator (URL). In one example, the controller is structured to issue a command via a point-to-point channel. In one example, the transceiver is structured to receive the first data from a battery powered sensor. In one example, the transceiver is structured to receive data indicative of a physical measurement.

The present system is most readily realized in a network communications system, although any suitable communication system may be employed. A block diagram of an exemplary network communications system 100 is illustrated in FIG. 1. In general, the illustrated system 100 includes a plurality of wireless stations 102, which wirelessly communicate with a plurality of associated access points 104. Each access point 104 executes a control application for one or more wireless stations 102. In the example illustrated, the control application is requested by the wireless station 102 and downloaded to the access point 104 from an application server 106 via a network 108. Data gathered by the wireless station 102 is then transmitted back to the application server 106 for storage in a database 110.

More specifically, each wireless station 102 may be any suitable type of wireless device. For example, the wireless station 102 may be a sensor structured to take one or more types of physical measurements such as temperature, sound, pressure, humidity, light, gas flow, liquid flow, heart rate, etc. The wireless station 102 may be connected to an AC power source and/or the wireless station 102 may be battery powered. For example, a plurality of battery powered temperature sensors may be placed in a warehouse to trigger an alarm if the temperature exceeds some predefined threshold.

Each wireless station 102 is controlled by an access point 104. In an example, the access point 104 and the wireless station 102 open a point-to-point data channel for communication of data and commands associated with the control application. For example, the access point 104 may be an 802.11 type router that is capable of dynamically loading and executing a software application for controlling one or more associated wireless stations 102. As described in more detail below, the access point 104 may load and execute a particular software application for controlling a particular wireless station 102 based on an application identifier that comes from that wireless station 102. If the access point 104 already has a local copy the software application indicated by the application identifier, the access point 104 need not load that software application again. In some instances, the access point 104 broadcasts a signal indicating to nearby wireless stations 102 that the access point 104 has the capability to dynamically accept station control software and/or that certain station control software is already installed on the access point 104. This then may permit the wireless stations 102 to preferentially select such access points 104 to associate with over those access points 104 that do not provide such advertisement.

When a software application is needed, the access point 104 may request a copy of the software application from an application server 106 via a network 108. The address of the application server 106 is either directly or indirectly specified by the application identifier. For example, the wireless station 102 may transmit a uniform resource locator (URL) to the access point 104, which identifies the application server 106 and the application (e.g., ftp://AccessPointApps.com/TemperatureAlarm1).

More than one wireless station 102 may be controlled by the same access point 104. In such an instance, the access point 104 may be executing the same control application for more than one wireless station 102, and/or the access point 104 may be executing different control applications for different wireless stations 102. For example, one access point 104 may be controlling two wireless stations 102 that are taking temperature measurements for one application, and the same access point 104 may be controlling another wireless station 102 that is taking pressure measurements for a different application.

The software application causes the access point 104 to (a) issue commands to the wireless station 102, (b) receive data from the wireless station 102, and (c) transmit the data back to the application server 106 (and/or a different server 106) for processing and/or for storage in an associated database 110. The commands that the access point 104 issues to the wireless station 102 may include, but are not limited to, commands related to what measurements the wireless station 102 should make, how often the wireless station 102 should take measurements, how often the wireless station 102 should wake up, etc. For example, the access point 104 may instruct the wireless station 102 to wake up and take a temperature measurement every minute and to transmit the temperature measurements to the access point 104 every five minutes. However, depending on the control application, after an hour of temperature measurements within some predefined range, the access point 104 may instruct the wireless station 102 to only take temperature measurements every two minutes and transmit the measurements back to the access point 104 every ten minutes. Further, the command information may provide for ranges of data such that the sensor may send back the data every ten minutes unless it falls outside a set range in which case it should wait no longer than one minute to make its report. In this example, the control application executed by the access point 104 is operating to conserve the battery power of the wireless station 102.

Moreover, the control application executed by the access point may schedule time periods for the wireless station to wake up based upon the timing synchronization function provided by the access point. This permits the wireless station to skip waking up for beacons on the wireless channel coming out at periodic beacon intervals. Because application timing and the beacon interval of an access point may not be related or synchronized, using the control application to establish wake up times based upon the timing synchronization function provided by the access point avoids unnecessary wake up events in cases where the control application requires the wireless station to wake up less often than the maximum power save interval typically supported by the access point or when the wake up schedule determined by the control application is dynamic. Additionally, the control application may coordinate the wake up schedules of a plurality of stations under its control in response to applications logic. For example, the applications logic may require wireless stations to wake up at different times to take measurements or check for possible updates.

If a wireless station 102 disassociates with the associated access point 104, then any applications tied to the wireless station 102 may be considered for termination. Any applications running on an access point 104 that are not tied to one or more associated wireless stations 102 may be removed from a list of active processes. If an application terminates, then the access point 104 may transmit a disassociation request to wireless stations 102 tied to that application. If the wireless station 102 is asleep when such request is sent, then the access point 104 may transmit the disassociation request the next time the wireless station 102 attempts to contact the access point 104. An application termination on the access point 104 may lead to messages directed to the application server 106 related to loss of contact with the wireless stations 102 under its control. In cases where the application terminates unexpectedly, the application server 106 may determine such failure through other means (e.g. timeouts for reports expected regarding wireless stations 102 to that the access point 104 controls).

Figure 2:
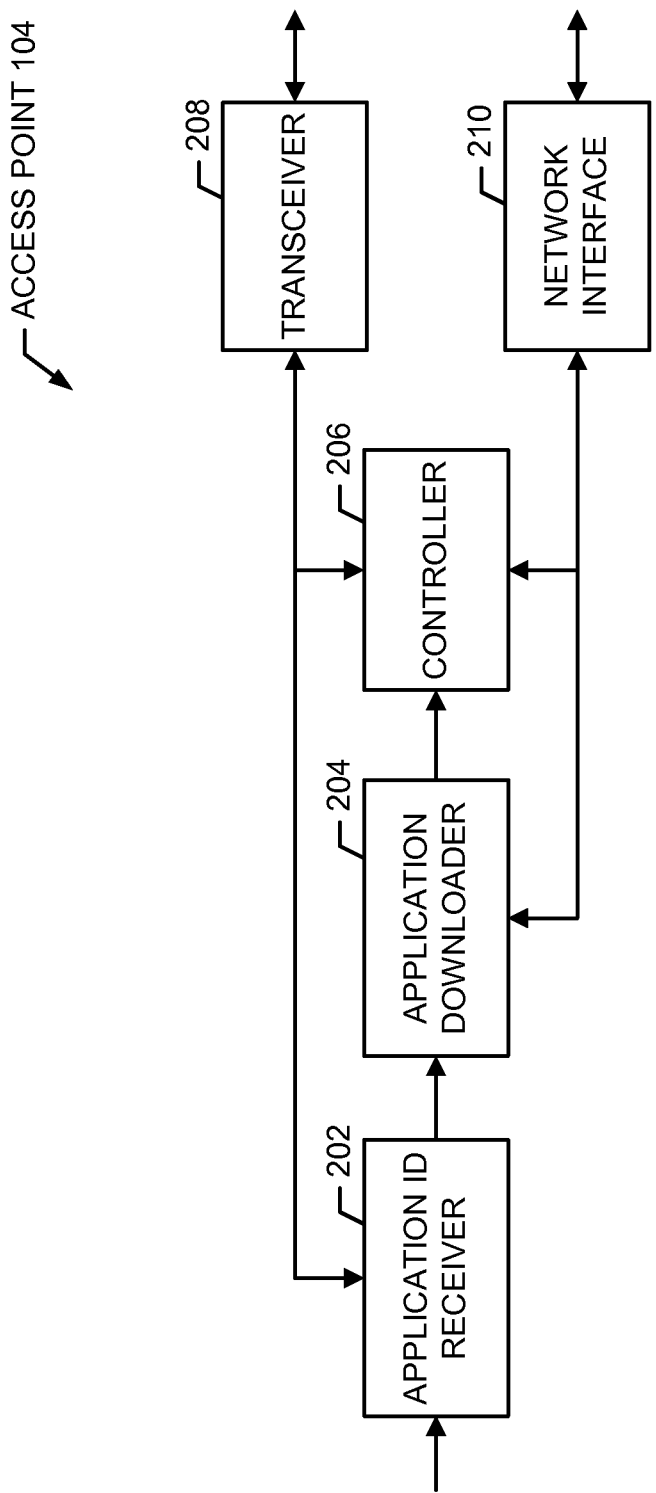
FIG. 2 is a block diagram of an example access point for controlling a wireless station.

A block diagram of certain elements of an example access point 104 for controlling a wireless station 102 is illustrated in FIG. 2. Each of these blocks may be embodied in one or more local and/or distributed software programs, which are stored in one or more memories and executed by one or more processors. Although the access point 104 is described with reference to the block diagram illustrated in FIG. 2, it will be appreciated that many other implementations may be used. For example, the order of many of the blocks may be changed, and some of the blocks described may be optional. One or more of the blocks may also be embodied in hardware or a combination of hardware and hardware executing software. Suitable hardware may include one or more application specific integrated circuits (ASICs), state machines, field programmable gate arrays (FPGAs), and/or other hardware.

In this example, an application ID receiver 202 receives a first application identifier from a first wireless station 102 at an access point 104. For example, a sensor structured to take one or more physical measurements, such as a temperature sensor, may send a uniform resource locator (URL) to the application ID receiver 202.

The application ID receiver 202 passes the application identifier on to an application downloader 204. The application downloader 204 downloads a software application to the access point 102 from a first server 106 based on the first application identifier. For example, the application downloader 204 may download a temperature sensing application from the URL provided by the temperature sensor.

The application downloader 204 passes the software application on to a controller 206. Upon receiving the software application, the controller 206 may install the application and begin running the application on the access point 104. The controller 206 issues a command to the first wireless station 102 based on the software application. For example, the controller 206 may issue a command associated with a sleep mode behavior of the first wireless station 106. In another example, the controller 206 may issue a command via a point-to-point channel.

After the wireless station 102 has acquired a desired number of measurements, a transceiver 208 receives first data from the first wireless station 102. For example, the transceiver 208 may receive temperature readings form a battery powered temperature sensor. Additionally, responsive to applications logic, the controller 206 may aggregate, process or transform the received first data from the wireless station 102. For example, the transceiver 208 may wait until conditions dictated by the applications logic are satisfied before releasing the data for further analysis or processing.

The controller 206 then passes the data on to a network interface 210. The network interface 210 transmits the first data to at least one of the first server 106 and a second different server 106. For example, the network interface 210 may transmit temperature readings back to the same server 106 where the temperature sensing application was downloaded and/or to another server 106.

Figure 3:
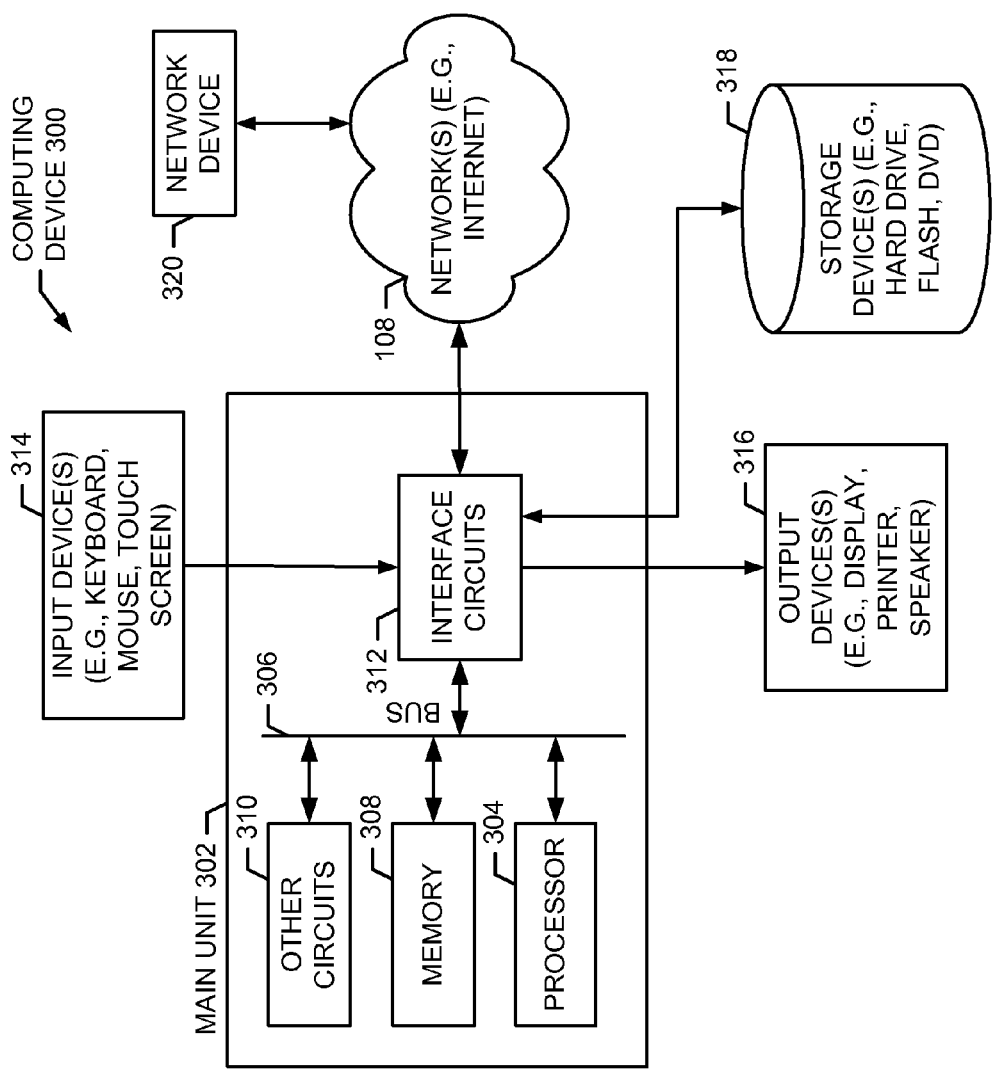
FIG. 3 is a block diagram of an example computing device.

Each of the devices illustrated in FIG. 1 may include certain common aspects of many computing devices such as microprocessors, memories, peripherals, etc. A detailed block diagram of the electrical systems of an example computing device is illustrated in FIG. 3.

The example computing device 300 includes a main unit 302 which may include one or more processors 304 electrically coupled by an address/data bus 306 to one or more memories 308, other computer circuitry 310, and one or more interface circuits 312. The processor 304 may be any suitable processor or plurality of processors. The memory 308 may include various types of non-transitory memory including volatile memory and/or non-volatile memory such as, but not limited to, distributed memory, read-only memory (ROM), random access memory (RAM) etc. The memory 308 typically stores a software program that interacts with the other devices in the system as described herein. This program may be executed by the processor 304 in any suitable manner. The memory 308 may also store digital data indicative of documents, files, programs, web pages, etc. retrieved from a server and/or loaded via an input device 314.

The interface circuit 312 may be implemented using any suitable interface standard, such as an Ethernet interface and/or a Universal Serial Bus (USB) interface. One or more input devices 314 may be connected to the interface circuit 312 for entering data and commands into the main unit 302. For example, the input device 314 may be a keyboard, mouse, touch screen, track pad, isopoint, and/or a voice recognition system.

One or more displays, printers, speakers, and/or other output devices 316 may also be connected to the main unit 302 via the interface circuit 312. The display 316 may be a cathode ray tube (CRTs), liquid crystal displays (LCDs), or any other type of suitable display. The display 316 generates visual displays of data generated during operation of the computing device 302. For example, the display 316 may be used to display web pages and/or other content received from a server. The visual displays may include prompts for human input, run time statistics, calculated values, data, etc.

One or more storage devices 318 may also be connected to the main unit 302 via the interface circuit 312. For example, a hard drive, CD drive, DVD drive, and/or other storage devices may be connected to the main unit 302. The storage devices 318 may store any type of data used by the computing device 302.

The computing device 302 may also exchange data with other network devices 320 via a connection to a network. The network connection may be any type of network connection, such as an Ethernet connection, digital subscriber line (DSL), telephone line, coaxial cable, etc. Users of the system may be required to register with a server. In such an instance, each user may choose a user identifier (e.g., e-mail address) and a password which may be required for the activation of services. The user identifier and password may be passed across the network using encryption built into the user's browser. Alternatively, the user identifier and/or password may be assigned by the server.

Figure 4:
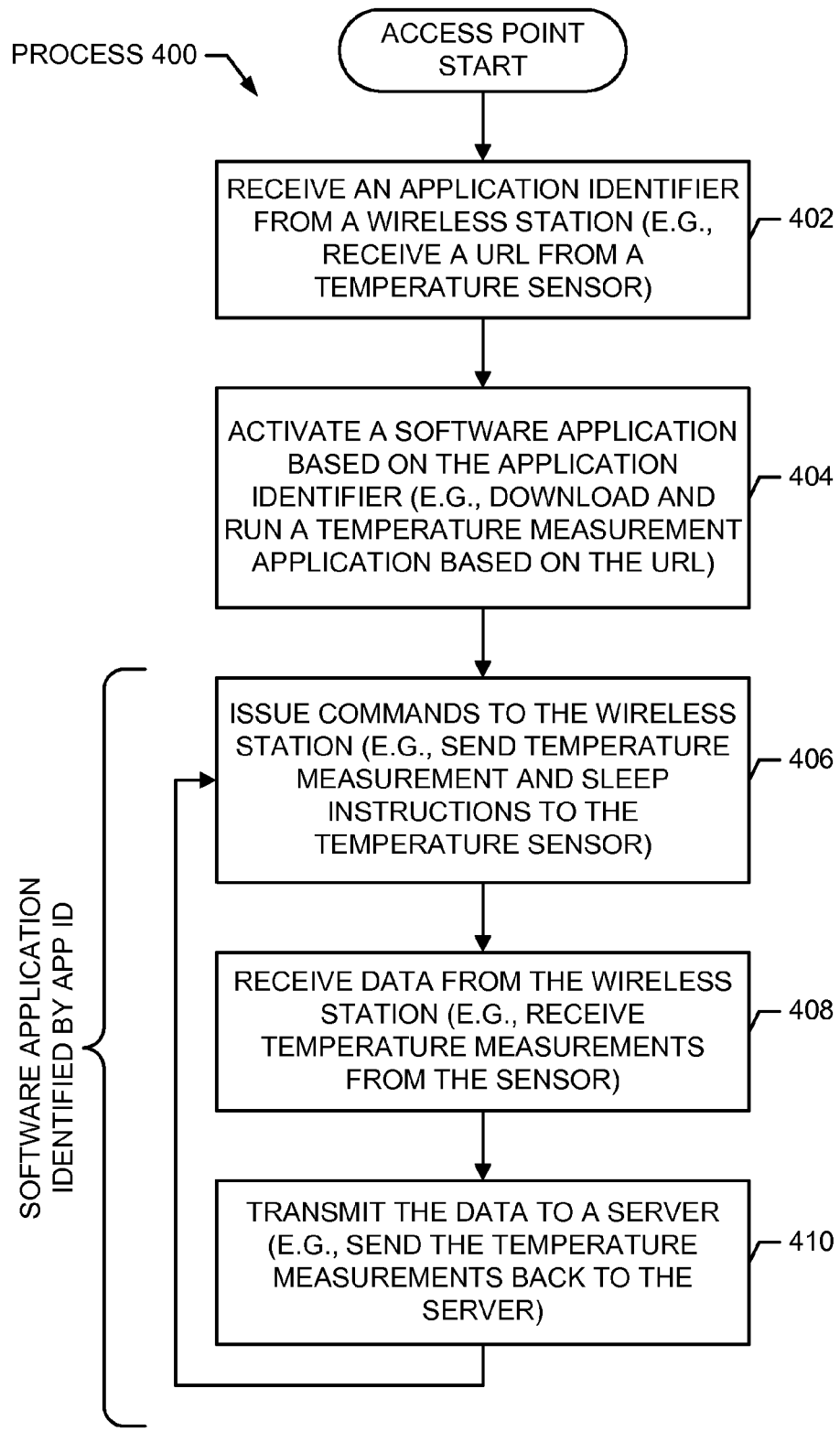
FIG. 4 is a flowchart of an example process for controlling a wireless station.

A flowchart of an example process 400 for controlling a wireless station is illustrated in FIG. 4. The process 400 may be embodied in one or more local and/or distributed software programs, which are stored in one or more memories and executed by one or more processors. Although the process 400 is described with reference to the flowchart illustrated in FIG. 4, it will be appreciated that many other methods of performing the acts associated with process 400 may be used. For example, the order of many of the steps may be changed, and some of the steps described may be optional. The process 400 may also be embodied in hardware or a combination of hardware and hardware executing software. Suitable hardware may include one or more application specific integrated circuits (ASICs), state machines, field programmable gate arrays (FPGAs), digital signal processors (DSPs), and/or other hardware.

In general, an access point 104, and/or any other suitable device or system, receives an application identifier (e.g., a URL) from a wireless station 102 (e.g., a temperature sensor). The access point 104 downloads the indicated application from a server 106, installs the application, and executes the application on behalf of the wireless station 102. Measurement and/or other data from the wireless station 102 is then transmitted back to the access point 104, which in turn sends the data back to the server 106.

More specifically, the example process 400 begins when an access point 104, and/or any other suitable device or system, receives a first application identifier from a first wireless station 102 at an access point 104 (block 402). For example, the access point 104 may receive a uniform resource locator (URL) from a temperature sensor.

The access point 104 then downloads and/or activates a software application to the access point 104 from a first server 106 based on the first application identifier (block 404). For example, the access point 104 may download a temperature measurement application based on the URL. The access point 104 then installs the software application and begins executing the software application. If the software application was previously installed on the access point 104, the access point 104 need not download the software application. As an example of how the order of some steps may be changed, the access point 104 may download the software application before the access point 104 receives the first application identifier from the first wireless station 102.

The access point 104 then issues a notification or command to the first wireless station 102 based on the software application (block 406). For example, the access point 104 may issue a notification to the first wireless station 102 to indicate successful installation of the software application. In another example, the access point 104 may issue a command associated with a sleep mode behavior of the first wireless station 102. In another example, the access point 104 may issue a command via a point-to-point channel associated with how frequently measurements should be taken.

The access point 104 then receives first data from the first wireless station 102 (block 408). For example, the access point 104 may receive the first data from a battery powered sensor, such as a temperature sensor. In another example, the access point 104 may receive data indicative of a physical measurement, such as temperature.

The access point 104 then transmits the first data to at least one of the first server 106 and a second different server 106 (block 410). For example, the access point 104 may transmit temperature measurements back to the same server 106 where the temperature sensing application was downloaded and/or to another server 106. Alternatively, responsive to applications logic, the access point 104 may aggregate, process or transform the received first data from the first wireless station prior to transmitting measurements back to the application server 106 where the station application was downloaded. For example, the transceiver 208 may wait until conditions dictated by the applications logic are satisfied before releasing the data for further analysis or processing at the server 106.

Figure 5A:
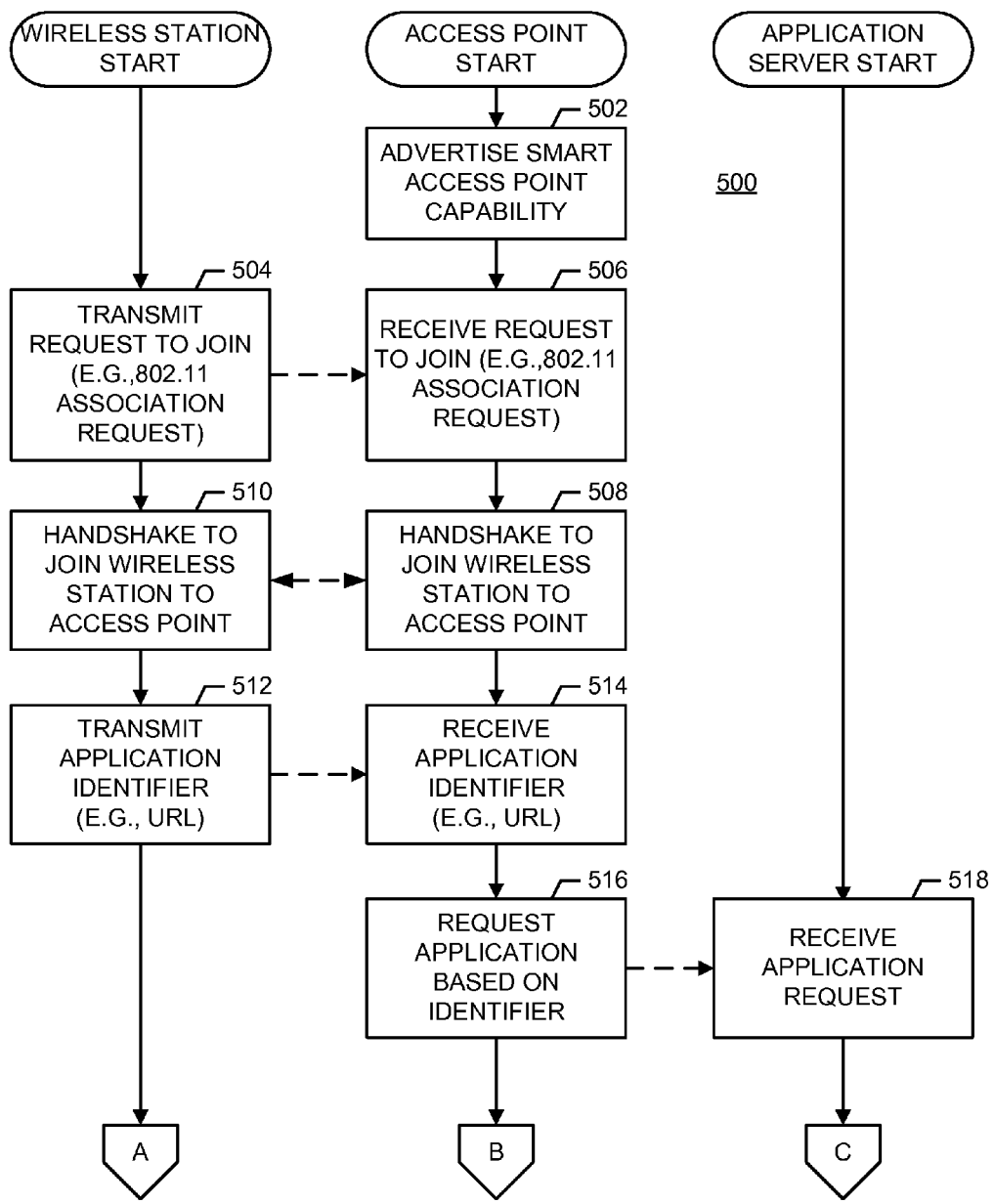
FIGS. 5A and 5B are a flowchart of another example process for controlling a wireless station.
Figure 5B:
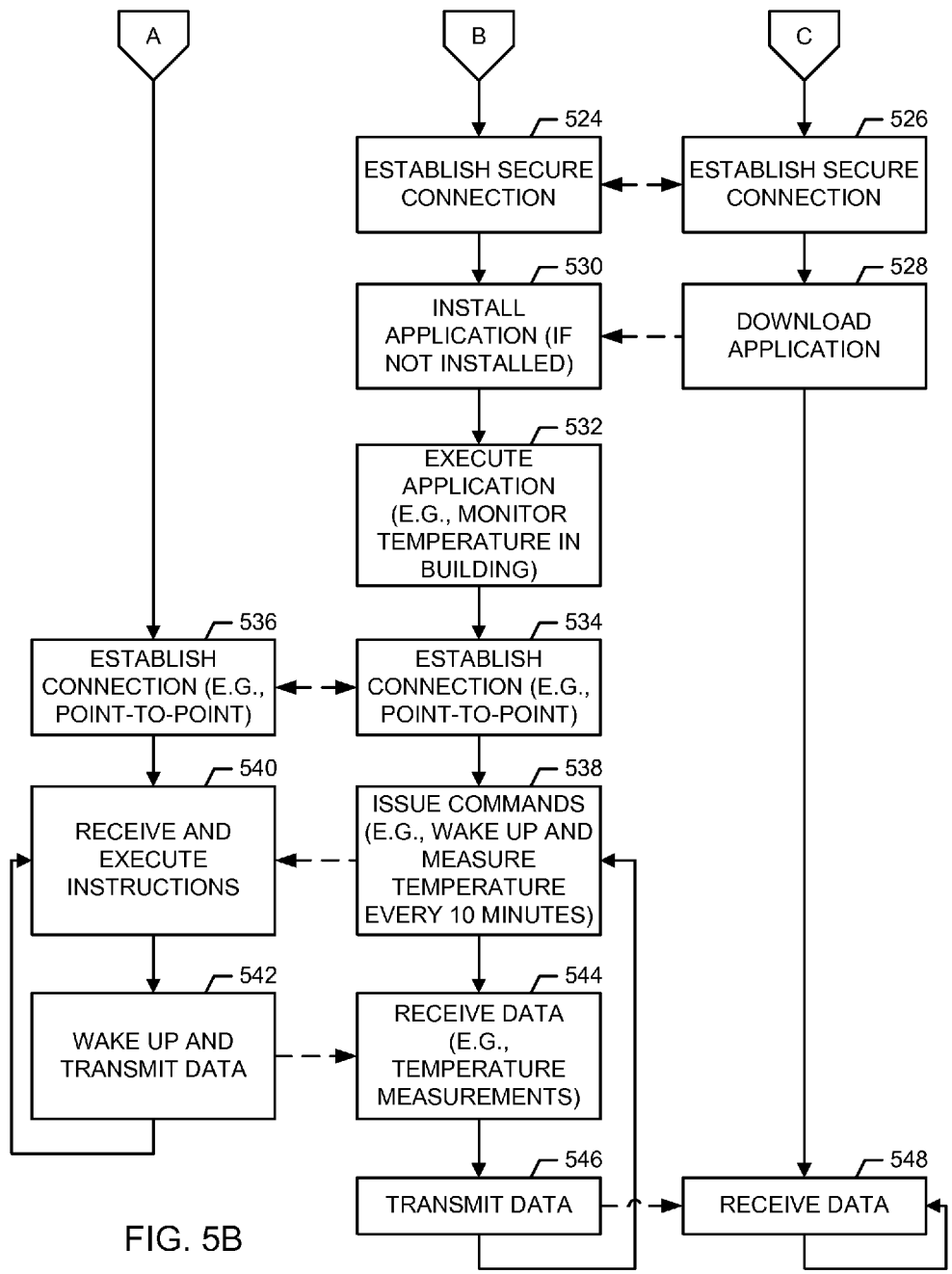

A flowchart of another example process 500 for controlling a wireless station is illustrated in FIGS. 5A and 5B (herein collectively referred to as FIG. 5). The process 500 may be embodied in one or more local and/or distributed software programs, which are stored in one or more memories and executed by one or more processors. Although the process 500 is described with reference to the flowchart illustrated in FIG. 5, it will be appreciated that many other methods of performing the acts associated with process 500 may be used. For example, the order of many of the steps may be changed, and some of the steps described may be optional. The process 500 may also be embodied in hardware or a combination of hardware and hardware executing software. Suitable hardware may include one or more application specific integrated circuits (ASICs), state machines, field programmable gate arrays (FPGAs), digital signal processors (DSPs), and/or other hardware.

In general, an access point 104, and/or any other suitable device or system, broadcasts its ability to execute applications for controlling one more wireless stations 102. In response, the access point 104 receives an application identifier (e.g., a URL) from a wireless station 102 (e.g., a temperature sensor). The access point 104 downloads the indicated application from an application server 106 via a secure bootstrap process and executes the application to issue commands to the wireless station 102 via a point-to-point connection to the wireless station 102. Measurement and/or other data from the wireless station 102 is then transmitted back to the access point 104, which in turn sends the data back to the application server 106 and/or another server.

More specifically, the example process 500 begins when an access point 104, and/or any other suitable device or system, advertises a smart access point capability (block 502). For example, the access point 104 may send out a signal indicating that the access point 104 is capable of accepting an application identifier (e.g., a URL) and downloading a wireless station application based on the application identifier. The access point 104 may also broadcast a list of applications the access point 104 already has installed and/or is capable of installing and executing. In such an instance, the wireless station 102 may select one of the applications in the list of applications by transmitting an associated application identifier to the access point 104. In one embodiment, any of these signals may comprise information elements that are included in an IEEE 802.11 Beacon Frame or an IEEE 802.11 Probe Response Frame.

When a wireless station 102 is ready to associate with the access point 104, the wireless station 102 transmits a request to join the access point 104 (block 504). For example, the access point 104 may send an 802.11 association request. In response to receiving the request to join (block 506), the access point 104 and the wireless station 102 each perform a handshake process to associate the wireless station 102 to the access point 104 (blocks 508 and 510).

Once the wireless station 102 is associated with the access point 104, the wireless station 102 sends an application identifier to the access point 104 (block 512). For example, the wireless station 102 may send a uniform resource locator (URL) to the access point 104. Alternatively, the wireless station 102 may embed the application identifier in the association request sent to the access point 104.

Once the access point 104 receives the application identifier (block 514), the access point 104 requests the application based on the application identifier (block 516). For example, the access point 104 may download the application from an application server 106 via the Internet or other suitable network 108 using a URL supplied by the wireless station 102. Alternatively, the access point 104 may download a list of applications from the application server 106 using a URL supplied by the wireless station 102. For example, the URL supplied by the wireless station 102 may identify a server hosting a collection of one or more station applications and may identify a station application from the collection of station applications to install at the access point 104. In another embodiment, the wireless station 102 may obtain a list of available station applications and identifiers using a protocol such as Generic Advertisement Service (GAS—IEEE 802.11u), which may permit the query to be directed to one or more application servers 106 available on the network 108. The wireless station 102 may select an application from the list of available station applications and request the access point 104 to install the selected station application. Upon receiving a request from the wireless station 102, the access point 104 installs the station application based upon the identifier selected by the wireless station 102 from the list of application identifier received in the GAS message In the example illustrated in FIG. 5, in response to receiving the application request (block 518), the application server 106, initiates a bootstrap process with the access point 104. The bootstrap process establishes a secure tunnel between the access point 104 and the application server 106 (blocks 524 and 526). The application server 106 then securely downloads the application to the access point 104 (block 528) through the established tunnel, and the access point 104 installs the application (block 530). In some cases, the application may have been previously installed on the access point 104. In such an instance, certain portions of the process 500 may not be needed and may be skipped (e.g., blocks 516-530).

Once the application is installed, the access point 104 executes the application (block 532). For example, the access point 104 may execute an application to monitor the temperature in a building using one or more wireless temperature sensors. Executing the application causes the access point 104 to issue commands to the wireless station 102 and receive data from the wireless station 102. Accordingly, the access point 104 and the wireless station 102 establish a wireless connection (blocks 534-536). For example, the access point 104 and the wireless station 102 may establish an 802.11 point-to-point connection. As an example of how the order of some blocks may be changed, the access point 104 and the wireless station 102 may establish a wireless connection (blocks 534-536) before the access point 104 receives the application identifier (block 514), and/or the access point 104 requests the application based on the application identifier (block 516).

Additionally, the wireless station 102 may employ a secure point-to-point connection to ensure privacy of the data transmitted over the point-to-point connection and to ensure data origin authenticity. In one embodiment, data may be encrypted by the wireless station 102 and decrypted by the application logic at the access point 104 and/or by the application server 106. In this embodiment, the IEEE 802.11 data confidentiality protocols may not be needed to encrypt the measurement or observation data. In another embodiment, the wireless station 104 and the access point 104 may establish secure communications using IEEE 802.11 protocols, such as the 4-way handshake. In such a case, the pairwise key used to secure the 4-way handshake may be previously installed at the wireless station 104, or the pairwise key could be derived during the installation of the application at the access point 104.

The access point 104 may then issue commands to the wireless station 102 according to the application being executed by the access point 104 (block 538). For example, the access point 104 may instruct the wireless station 102 to wake up and take a temperature reading every ten minutes. In response, the wireless station 102, receives and executes the instructions (block 540). For example, the wireless station 102 may change a timer to wake up and take a temperature reading every ten minutes instead of every five minutes in order to conserve battery power at a time that the application executing at the access point 104 determines that less frequent readings are sufficient. In another embodiment, the access point 104 may notify the wireless station 102 that the application has been installed and initialized, and instructing the wireless station 102 to begin querying the access point 104 for further information or instructions. For example, the access point 104 may transmit the notification to the wireless station 102 in an IEEE 802.11 Association Response message. Upon receiving notification from the access point 104, the wireless station 102 may, for example, begin reporting measurements on a pre-programmed schedule in accordance with application logic known by the wireless station 102 to be associated with an application identifier selected by the wireless station 102.

At the appropriate time, the wireless station 102 wakes up and transmits its data to the access point 104 (block 542). In turn, the access point 104 receives the data (block 544) and transmits the data to the server 106 (blocks 546 and 548). The server 106 may be the same server used to download the application and/or a different server. As the application continues to execute at the access point 104, the access point 104 may issue additional commands to the wireless station 102 (block 538). For example, the access point 104 may instruct the wireless station 102 to wake up and take a temperature reading every twenty minutes. In response, the wireless station 102, receives and executes the new instructions (block 540). At the appropriate time, the wireless station 102 again wakes up and transmits its data to the access point 104 (block 542). In turn, the access point 104 receives the data (block 544) and transmits the data to the server 106 (blocks 546 and 548). The wireless station 102 may transit its observation and/or measurement information to the access point within IEEE 802.11 data frames. For example, in one embodiment, the IEEE 802.11 data frame encapsulates a header specifying a type field. The type field may be set to indicate that the data frame contains information for an application that has been installed at the access point 104. In this embodiment, the header is a Subnetwork Access Protocol (SNAP) header, and the type field may be an EtherType field reserved for use by control applications.

In summary, persons of ordinary skill in the art will readily appreciate that methods and apparatus for controlling a wireless station have been provided. Among other advantages, wireless sensors in the disclosed system conserve battery power by offloading much of the data processing and communication overhead to the access point. The wireless sensors only execute the portions of the application required to gather and forward data, and not the full application logic. For example, a sensor may quickly communicate a set of readings to the access point using a low overhead 802.11 or similar point-to-point protocol, and the access point, which is typically connected to a wired power source, may then take on the additional burden and overhead associated with communicating over the Internet to a server. For example, the wireless station may not need to implement protocols such as Internet Protocol (IP), Transport Control Protocol (TCP) or Hyper-Text Transport Protocol (HTTP) to send data to the access point, which can implement these protocols. In those cases where network communication errors might arise it is also more efficient for the access point to resolve problems (e.g. via temporary storage and delayed message retransmission). Having the access point execute the server communication application logic instead of the wireless sensor reduces the amount of processing the wireless sensor must perform, thereby conserving battery power.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of issuing commands to a wireless station, the method comprising:
   receiving, via a transceiver in an access point, a first application identifier from a first wireless station wirelessly communicatively coupled to the access point;
   activating a software application in a controller of the access point based on the first application identifier;
   issuing a command, based on the software application, via the transceiver to the first wireless station;
   receiving, via the transceiver, first data from the first wireless station; and
   transmitting the first data to a first server.

2. The method of claim 1, wherein issuing a command to the first wireless station based on the software application includes issuing a command associated with a sleep mode behavior of the first wireless station.

3. The method of claim 1, further comprising:
   receiving a second application identifier from a second different wireless station at the access point, the second application identifier being indicative of the software application;
   determining that the software application is already installed on the access point; and
   executing the software application at the access point, the software application causing the access point to (a) issue commands to the second wireless station, (b) receive second data from the second wireless station, and (c) transmit the second data to at least one of the first server and a second different server.

4. The method of claim 1, wherein the access point broadcasts a signal indicative of a capability of the access point to dynamically accept station control software.

5. The method of claim 1, wherein receiving a first application identifier from a first wireless station at an access point includes receiving a uniform resource locator (URL).

6. The method of claim 1, wherein activating the software application includes downloading the software application to the access point based on the first application identifier.

7. The method of claim 1, wherein issuing a command to the first wireless station based on the software application includes issuing a command via a point-to-point channel.

8. The method of claim 1, wherein receiving first data from the first wireless station includes receiving the first data from a battery powered sensor.

9. The method of claim 1, wherein receiving first data from the first wireless station includes receiving data indicative of a physical measurement.

10. The method of claim 1, further comprising deactivating the software application.

11. The method of claim 10, further comprising transmitting a signal indicating that the software application is not supported.

12. The method of claim 10, further comprising transmitting a signal indicating that the first wireless station is denied a connection to the access point.

13. An apparatus for issuing commands to a wireless station, the apparatus comprising:
   an application ID receiver operatively coupled to a transceiver in an access point, the application ID receiver structured to receive, from the transceiver, a first application identifier from a first wireless station wirelessly communicatively coupled to the access point;
   an application downloader operatively coupled to the application ID receiver and to a controller in the access point, the application downloader being structured to download, to the controller, a software application from a first server based on the first application identifier;
   the controller being structured to issue a command to the first wireless station via the transceiver based on the software application;
   the transceiver being structured to receive first data from the first wireless station; and
   a network interface operatively coupled to the controller, the network interface being structured to transmit the first data to at least one of the first server and a second different server.

14. The apparatus of claim 13, wherein the controller is structured to issue a command associated with a sleep mode behavior of the first wireless station.

15. The apparatus of claim 13, wherein:
   the application ID receiver receives a second application identifier from a second different wireless station, the second application identifier being indicative of the software application;
   the application downloader determines that the software application is already installed on the access point; and
   the controller executes the software application at the access point, the software application causing the access point to (a) issue commands to the second wireless station, (b) receive second data from the second wireless station, and (c) transmit the second data to at least one of the first server and the second server.

16. The apparatus of claim 13, wherein the transceiver broadcasts a signal indicative of a capability of the access point to dynamically accept station control software.

17. The apparatus of claim 13, wherein the application ID receiver is structured to receive a uniform resource locator (URL).

18. The apparatus of claim 13, wherein the controller is structured to issue a command via a point-to-point channel.

19. The apparatus of claim 13, wherein the transceiver is structured to receive the first data from a battery powered sensor.

20. The apparatus of claim 13, wherein the transceiver is structured to receive data indicative of a physical measurement.

21. The apparatus of claim 13, wherein the controller is structured to deactivate the software application.

22. The apparatus of claim 21, wherein the controller is structured to initiate a signal indicating that the software application is not supported.

23. The apparatus of claim 21, wherein the controller is structured to initiate a signal indicating that the first wireless station is denied a connection to the access point.

24. A method of issuing commands to a battery powered sensor, the method comprising:
   receiving, from a transceiver in an access point, a first uniform resource locator (URL) from a first battery powered sensor wirelessly communicatively coupled to the access point;
   downloading a first software application from a first server based on the uniform resource locator (URL);
   issuing a command to the first battery powered sensor associated with a sleep mode behavior of the first battery powered sensor based on the first software application;

receiving first data from the first battery powered sensor, the first data including physical measurement data;

transmitting the first data to at least one of the first server and a second different server;

receiving, from the transceiver, a second uniform resource locator (URL) from a second different battery powered sensor wirelessly communicatively coupled to the access point, the second uniform resource locator (URL) being indicative of a second different software application;

determining that the second software application is already installed on the access point; and executing the second software application in a controller of the access point, the second software application causing the access point to (a) issue commands to the second battery powered sensor, (b) receive second data from the second battery powered sensor, and (c) transmit the second data to at least one of the first server and the second server.

25. The method of claim 24, wherein the transceiver broadcasts a signal indicative of a capability of the access point to dynamically accept station control software.

26. The method of claim 24, further comprising deactivating the first software application.

27. The method of claim 26, further comprising transmitting a signal indicating that the first software application is not supported.

28. The method of claim 26, further comprising transmitting a signal indicating that the first battery powered sensor is denied a connection to the access point.

* * * * *